United States Patent [19]

Kwon

[11] Patent Number: 5,761,168
[45] Date of Patent: Jun. 2, 1998

[54] CD-ROM DRIVE TESTING METHOD

[75] Inventor: Young-sig Kwon, Suwon, Rep. of Korea

[73] Assignee: Samsung Electronics Co., Ltd., Kyungki-do, Rep. of Korea

[21] Appl. No.: 811,926

[22] Filed: Mar. 5, 1997

[30] Foreign Application Priority Data

Apr. 15, 1996 [KR] Rep. of Korea .................. 96-11280

[51] Int. Cl.$^6$ ..................................... G11B 7/00
[52] U.S. Cl. ..................... 369/58; 369/53; 395/183.01
[58] Field of Search ........................... 369/32, 58, 54, 369/60, 34, 53; 395/183.01, 183.18, 183.19, 183.2, 184.01, 182.22

[56] References Cited

U.S. PATENT DOCUMENTS 5,615,335  3/1997  Onffroy .................. 395/183.18
5,664,094  9/1997  Taniwa et al. ........... 395/183.18

*Primary Examiner*—Nabil Hindi
*Attorney, Agent, or Firm*—Sughrue, Mion, Zinn, Macpeak & Seas, PLLC

[57] ABSTRACT

A method for testing CD-ROM drives is disclosed. A plurality of CD-ROM drives are connected to a computer and then CD-ROMs having the same contents are loaded in each drive. The data read out from the CD-ROM loaded in a CD-ROM drive is stored and the stored data and the data read out from a CD-ROM loaded in another CD-ROM drive is compared to check the operation of each drive.

10 Claims, 4 Drawing Sheets

CD-ROM DRIVE TESTING METHOD

BACKGROUND OF THE INVENTION

The present invention relates to a compact disc-read only memory (CD-ROM) drive, and more particularly, to a method for testing the reading operation of CD-ROM drives.

Generally, a CD-ROM, such as a music CD, is capable of storing 680 Mb of data which can be reproduced using a laser beam. CD-ROM drives are conventionally classified according to the type of interface used. Available models include AT-BUS type, a small computer system interface (SCSI) type, and an enhanced integrated development environment (IDE) type.

The AT-BUS type has been widely used due to its simple installation and low price; however, it has a compatibility problem since different interfacing modes are used by different drive manufacturers. The SCSI type has a high data transmission rate of 40Mb per second, compared with the 1.5~2Mb of the AT-BUS type, and excellent extensibility which allows use of peripheral devices by up to seven units. However, it is disadvantageous in that an extra, rather expensive, SCSI controller card is necessary.

The enhanced IDE type is a new high speed interface type developed to overcome the drawbacks of the AT-BUS type and the SCSI type. Having faster data transmission speed than that of the AT-BUS type, it allows display of a smooth moving picture. Another advantage is that the enhanced IDE type can be connected using a standard 40 pins connection cable of a hard disk instead of an independent interface.

FIG. 1 is a diagram schematically showing the structure of a general CD-ROM drive system.

Referring to FIG. 1, a spindle motor 12 rotates a disk 11 which is seated on a turntable 12t. A pick-up device 13 is used for reproducing the information recorded on the disk. A central processing unit (CPU) 14 controls the overall system, and a servo signal processor (SSP) 15 is provided for driving 10 the spindle motor 12 and transmitting a predetermined signal from the pick-up device 13 to the CPU 14.

While conventional method for testing CD-ROM drive are available, there has been no process available for storing the accuracy of the data read out from the CD-ROM.

SUMMARY OF THE INVENTION

To solve the above problem, it is an object of the present invention to provide a method for testing the reading accuracy of CD-ROM drives.

To achieve the above object, a CD-ROM drive testing method is disclosed, the method comprising the steps of: (a) loading CD-ROMs having the same contents in respective CD-ROM drives to be tested; (b) specifying one drive among the CD-ROM drives to be tested; (c) reading data from the CD-ROM loaded in the specified drive; (d) storing the read data in a first file; (e) specifying another drive among the CD-ROM drives to be tested; (f) reading data from the CD-ROM loaded in the second specified drive; (g) storing the read data in a second file; (h) comparing the data stored in the first and the second files; and (i) processing the program as an error if it is determined in the step (h) that the compared data is not matched.

According to the CD-ROM drive testing method of the present invention, a plurality of CD-ROM drives are connected to a computer system, and a plurality of CD-ROMs having the same contents are loaded in the drives, respectively. The data read out from the CD-ROM loaded in a specified CD-ROM drive is stored in a memory, and the stored data is compared with the data read out from the CD-ROM loaded in another CD-ROM drive. Consequently, a reading error can be detected so that it can be checked whether the CD-ROM drive operates normally.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Figure 1:
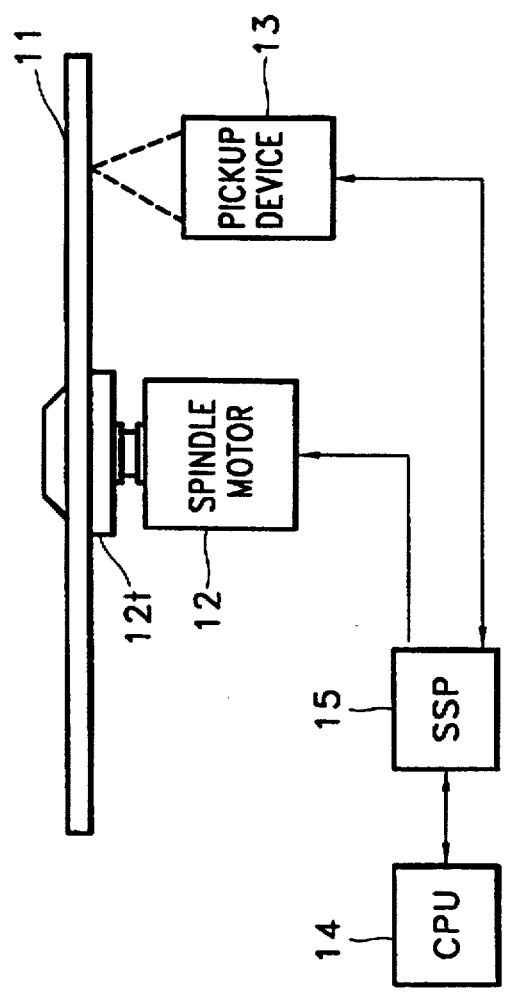
FIG. 1 is a diagram schematically showing the structure of a general CD-ROM drive system.
Figure 2:
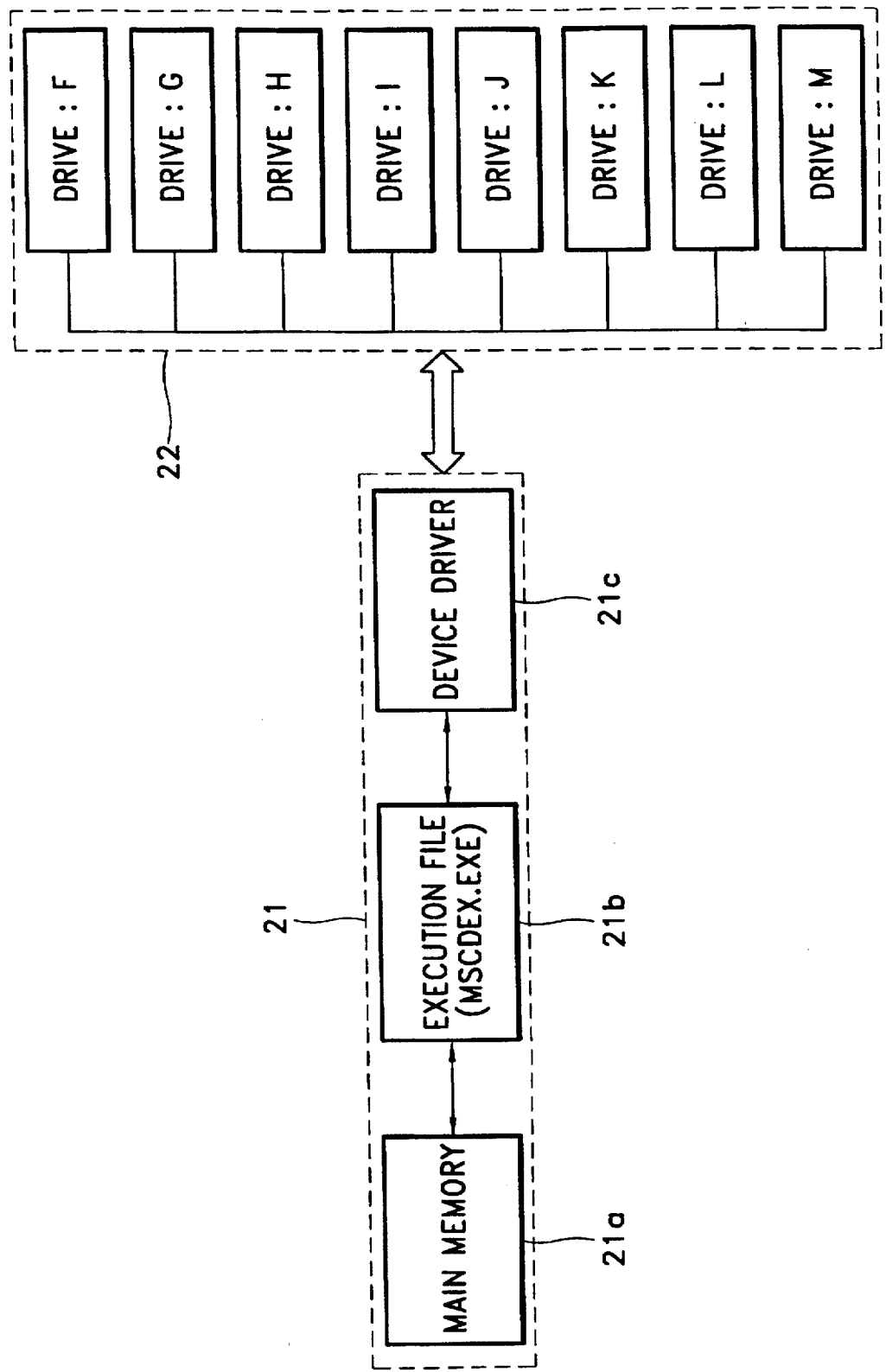
FIG. 2 is a diagram schematically showing the structure of the hardware for a CD-ROM drive testing method according to the present invention.

As shown in FIG. 2, according to the preferred embodiment, a plurality of CD-ROM drives to be tested are connected to a general personal computer (PC) 21. The PC 21 includes a main memory 21a, an execution file 21b, having a file name such as "MSCDEX.EXE", for executing a predetermined command or program, and a device driver 21cfor driving the plurality of CD-ROM drives. Also, a testing program for testing CD-ROM drives is preprogrammed by the user and stored in the main memory 21a. In this particular example, eight drives are connected to the PC, and the testing program is preprogrammed for testing eight drives.

After the hardware having the above structure is prepared, the plurality of CD-ROM drives are tested according to the method of the present invention. The CD-ROM testing method will be described with reference to FIG. 3.

Figure 3:
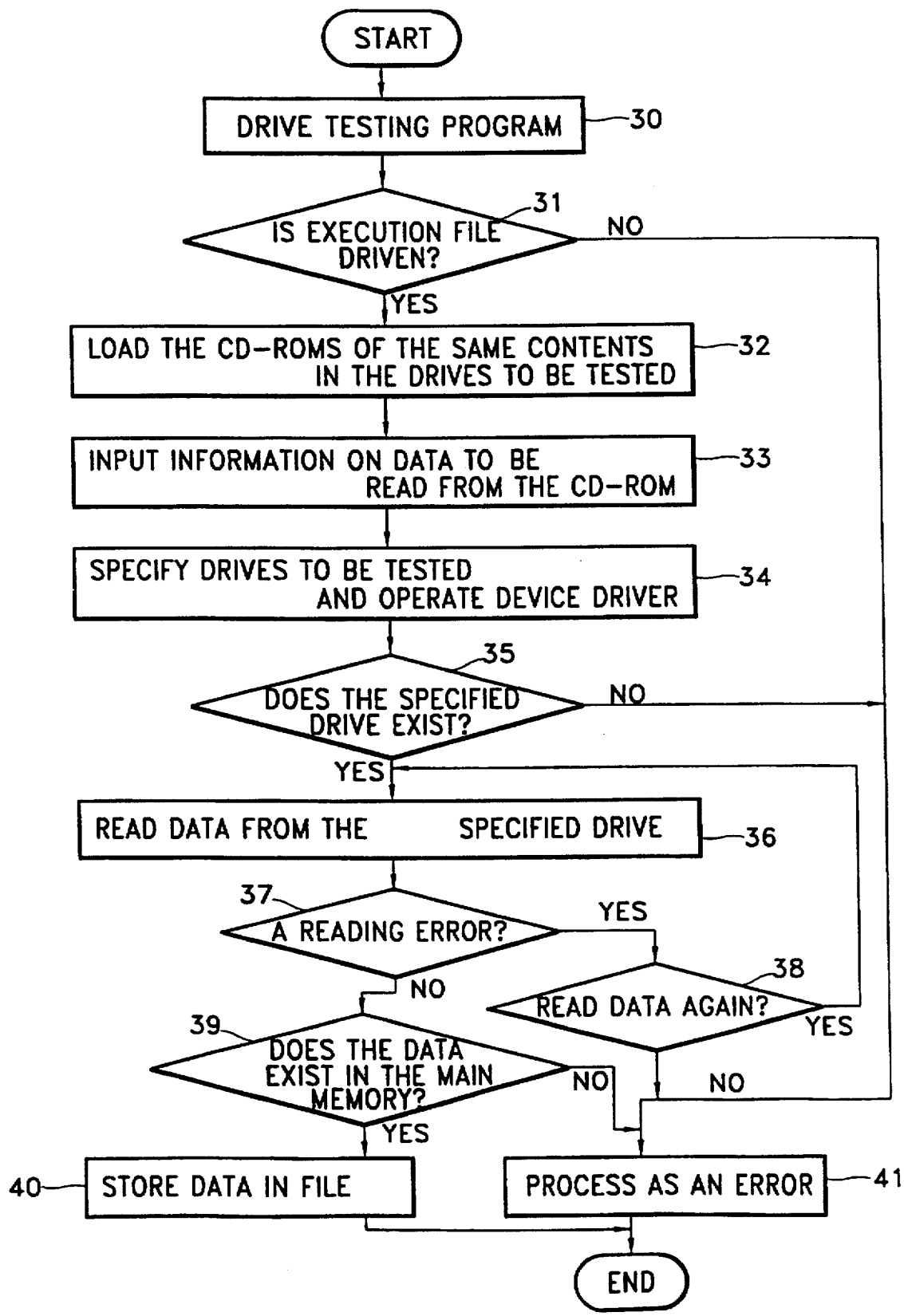
FIG. 3 is a flowchart illustrating the processes of the CD-ROM drive testing method according to the preferred embodiment of the present invention.

Referring to FIG. 3, first, a testing program for testing the CD-ROM drives is loaded (step 30). Then, it is checked whether the execution file (see 21b of FIG. 2) related to the reading of information from the CD-ROM drive is driven (step 31). If the execution file is not driven in step 31, the program is processed as an error (step 41). If the execution file is driven, CD-ROMs having the same contents are loaded in the plurality of CD-ROM drives to be tested (step 32).

Next, information regarding the data to be read from the CD-ROM, e.g., a start address to be read, the number of blocks to be read, etc., is set and input to the main memory 21b(step 33). Then, after specifying a drive to be tested among the plurality of CD-ROM drives, the device driver 21cis operated (step 34). Thereafter, it is checked whether the specified drive is present (step 35). If it is determined in step 35 that the specified drive does not exist, the program is processed as an error (step 41). If the specified drive exists, a predetermined data is read from the CD-ROM loaded in the drive according to the set information, and then stored in the main memory 21a (see FIG. 2) (step 36). Here, it is checked whether an error occurs during the reading of the data from the specified drive using a known method, such as bit parity check (step 37). If data reading error occurs, it is determined whether to read out the data again (step 38). This can be done by setting a "tolerance" level for bit parity errors. If it is determined in step 38 that the error is trivial, a determination is made to read out the data again and the program returns to step 36. Otherwise, the program is processed as an error (step 41). The decision regarding whether the error is trivial or significant can be made by making reference to appropriate parameters stored in the main memory 21a.

In addition, if it is determined in step 37 that no reading error occurred, it is checked whether the data read out from the drive exists in the main memory 21a (step 39). If it is determined in step 39 that the data does not exist, the program is processed as an error (step 41). If the data exists, the data is stored in a predetermined file (step 40).

Meanwhile, after specifying another drive to be tested among the plurality of CD-ROM drives, steps 34 through 41 are repeated. The data read out through the above steps is stored in a separate file. The data of the two files is then compared to determine whether the data is the same, and to thereby check the reading operation of each drive.

Hereinafter, an example of the CD-ROM drive testing method will be described in detail with reference to FIG. 4.

Figure 4:
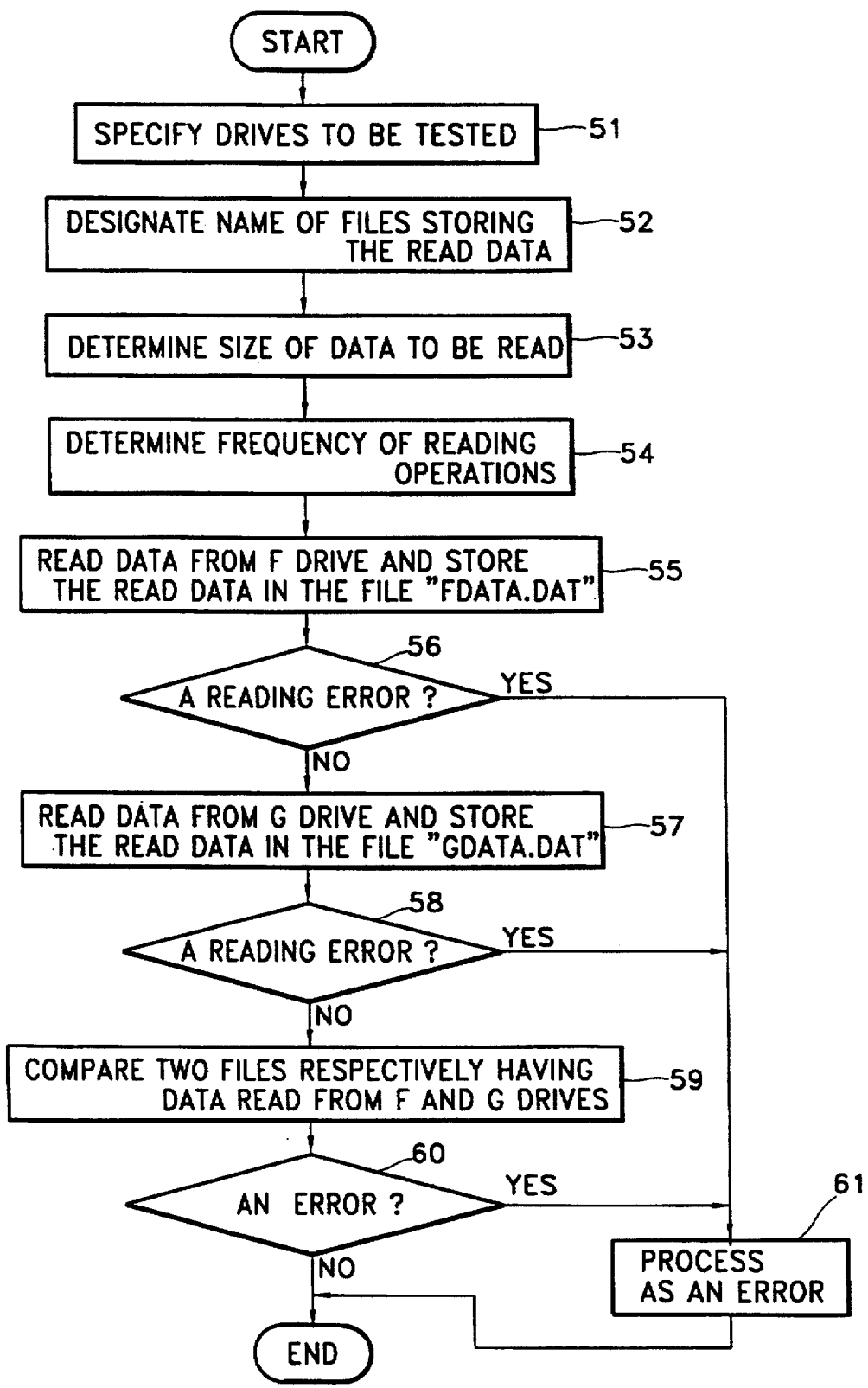
FIG. 4 is a flowchart for explaining an example of a detailed testing process according to the CD-ROM drive testing method of the present invention.

FIG. 4 is a flowchart for explaining an example of a detailed testing process according to the CD-ROM drive testing method of the present invention.

Referring to FIG. 4, when drives to be tested are specified (step 51) as in step 34 of FIG. 3 (for example, press "F" and "G" keys to specify drives F and G as the drives to be tested), names of files where the data read out from the drives is to be stored are designated (step 52). For example, file names in which the data read out from the drives F and G is to be stored are designated as "FDATA.DAT" and "GDATA.DAT", respectively.

After the file name is designated, the size of the data to be read out from a CD-ROM is determined (step 53). For example, numeric keys "1," "2," "4" and "8" are input when the data size is 1 block (2048 bytes), 2 blocks (4096 bytes), 4 blocks (8192 bytes), and 8 blocks (16384 bytes), respectively.

After the size of the data to be read is determined in the above way, it is determined how many times data will be read from each drive (step 54). Then, the data is read from the F drive and then the read data are stored in the file "FDATA.DAT" (step 55). At this time, it is determined whether the data of the CD-ROM is normally read out from the F drive (step 56). If a data reading error occurs in step 56, the program is processed as an error (step 61) to terminate the program. However, if no data reading error occurs in step 56, the data is read from the G drive to store the read data in the file "GDATA.DAT" (step 57). Here, it is also determined whether a data reading error occurs during the data reading process of the G drive (step 58). If data reading error occurs in step 58, the program is processed as an error (step 61) to terminate the program. However, if no data reading error occurs in step 58, the contents of the above two files "FDATA.DAT" and "GDATA.DAT" are compared with each other (step 59) to check whether an error has occurred or not (step 60). Here, if the contents of two files are different, that is, an error occurred, the program is processed as an error (step 61) and then the program is terminated. If no error occurs in step 60, the program is immediately terminated. Accordingly, it is checked through the above successive steps whether the CD-ROM drives operate normally.

As described above, according to the CD-ROM drive testing method of the present invention, a plurality of CD-ROM drives are connected to a computer and then CD-ROMs having the same contents are loaded in each drive. Then, the data read out from the CD-ROM loaded in one CD-ROM drive is stored and the stored data and the data read out from the same CD-ROM loaded in another CD-ROM drive are then compared to check the operating error of each drive. Thus, it can be checked whether each CD-ROM drive operates normally, thereby further increasing the reliability of the products.

What is claimed is:

1. A CD-ROM drive testing method comprising the steps of:

(a) loading CD-ROMs having the same contents in respective CD-ROM drives to be tested;

(b) setting information regarding data to be read from the CD-ROM;

(c) specifying a first drive among said CD-ROM drives to be tested;

(d) reading data from the CD-ROM loaded in said first drive according to said information;

(e) storing the data read by the first drive in a first file;

(f) specifying a second drive among the CD-ROM drives to be tested;

(g) reading data from the CD-ROM loaded in said second drive according to said set information;

(h) storing the data read by the second drive in a second file;

(i) comparing the data stored in said first and said second files; and (j) processing the program as an error if it is determined in said step (i) that the compared data is not coincident.

2. A CD-ROM drive testing method as claimed in claim 1, further comprising steps (d') and (g'), each comprising determining whether the data stored on the CD-ROM is normally read out by the CD-ROM drive after said steps (d) and (g), respectively.

3. A CD-ROM drive testing method as claimed in claim 2, further comprising a sub-step of determining whether the data is to be read again when a reading error occurs in said step (d') or (g').

4. A CD-ROM drive testing method as claimed in claim 1, wherein said information set in said step (b) includes information specifying the size of data to be read.

5. A CD-ROM drive testing method as claimed in claim 1, wherein said information set in said step (b) includes information specifying number of repeated data readings from the CD-ROM drive.

6. A system for testing reading operation of a plurality of CD drives having identical CD-ROM's loaded therein, said system comprising a computer having a plurality of CD drives connection terminals, wherein said computer is pre-programmed to perform the test comprising the steps:

(a) setting information regarding data to be read from the CD-ROM;

(b) specifying a first drive among said CD-ROM drives to be tested;

(c) reading data from the CD-ROM loaded in said first drive according to said information;

(d) storing the data read by the first drive in a first file;

(e) specifying a second drive among the CD-ROM drives to be tested;

(f) reading data from the CD-ROM loaded in said second drive according to said set information;

(g) storing the data read by the second drive in a second file;

(h) comparing the data stored in said first and said second files; and (i) processing the program as an error if it is determined in said step (h) that the compared data is not coincident.

7. A CD-ROM drive testing method as claimed in claim 6, further comprising steps (c') and (f'), each comprising determining whether the data stored on the CD-ROM is normally read out by the CD-ROM drive after said steps (c) and (f), respectively.

8. A CD-ROM drive testing method as claimed in claim 7, further comprising a sub-step of determining whether the data is to be read again when a reading error occurs in said step (c') or (f').

9. A CD-ROM drive testing method as claimed in claim 6, wherein said information set in said step (a) includes information specifying the size of data to be read.

10. A CD-ROM drive testing method as claimed in claim 6, wherein said information set in said step (a) includes information specifying the number of repeated data readings from the CD-ROM drive.

* * * * *